United States Patent
Maung et al.

(10) Patent No.: US 10,395,691 B1
(45) Date of Patent: Aug. 27, 2019

(54) DEVICE CONFIGURED TO SWITCH A TEST SYSTEM CHANNEL BETWEEN MULTIPLE DRIVE CONTROLLERS

(71) Applicant: Seagate Technology LLC, Cupertino, CA (US)

(72) Inventors: Kyaw Sin Maung, Bloomington, MN (US); Aaron M. Schmidt, Shakopee, MN (US)

(73) Assignee: Seagate Technology LLC, Cupertino, CA (US)

(*) Notice: Subject to any disclaimer, the term of this patent is extended or adjusted under 35 U.S.C. 154(b) by 32 days.

(21) Appl. No.: 15/680,509

(22) Filed: Aug. 18, 2017

(51) Int. Cl.
| G06F 13/40 | (2006.01) |
| G06F 15/78 | (2006.01) |
| G11B 20/18 | (2006.01) |
| G11C 29/00 | (2006.01) |

(52) U.S. Cl.
CPC ...... *G11B 20/1816* (2013.01); *G06F 13/4022* (2013.01); *G06F 15/7807* (2013.01)

(58) Field of Classification Search
CPC ............ G11B 20/1816; G06F 13/4022; G06F 15/7807
See application file for complete search history.

(56) References Cited

U.S. PATENT DOCUMENTS

| 7,596,722 | B1 | 9/2009 | Pakzad et al. | |
| 2004/0230711 | A1 | 11/2004 | Moon et al. | |
| 2007/0255990 | A1* | 11/2007 | Burke | G01R 31/318558 714/731 |
| 2008/0177922 | A1 | 7/2008 | Chow et al. | |

* cited by examiner

*Primary Examiner* — Samir W Rizk
(74) *Attorney, Agent, or Firm* — Hollingsworth Davis, LLC (57) ABSTRACT

A data storage drive has two controllers with respective digital control outputs and serial channels. The drive has a serial test channel operable to communicate with a testing system. A switching circuit is coupled to the digital control outputs, the serial channels, and the serial test channel. The switching circuit is configured to, in response to respective combinations of binary values set via the digital control outputs, switch lines of the serial test channel between the respective serial channels of the controllers. The controllers are configured to set the combinations of binary values in response to one or more command received via a receive line of the serial test channel.

20 Claims, 6 Drawing Sheets

| Control state (M,S) | MUX connection | | |
| --- | --- | --- | --- |
| | RXD | TXD | REQSVC |
| (1, 0) | M and S | M | M |
| (0, 0) | S | S | S |
| (0, 1) | M | M | M |
| (1, 1) | S | S | S |

DEVICE CONFIGURED TO SWITCH A TEST SYSTEM CHANNEL BETWEEN MULTIPLE DRIVE CONTROLLERS

SUMMARY

The present disclosure is directed to a device configured to switch a test system channel between multiple drive controllers. In one embodiment, a data storage drive includes first and second controllers having respective first and second digital control outputs and respective first and second serial channels. The drive includes a serial test channel operable to communicate with a testing system. The drive includes a switching circuit coupled to the first and second digital control outputs, the first and second serial channels, and the serial test channel. The switching circuit is configured to, in response to respective combinations of binary values set via the first and second digital control outputs, switch lines of the serial test channel between the respective first and second serial channels of the first and second controllers. The first and second controllers are configured to set the combinations of binary values in response to one or more command received via a receive line of the serial test channel.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disks. The storage capacity of hard disk drives (HDDs) have steadily increased due to the increase in areal density provided by such technological advances as perpendicular recording, shingled recording, helium filling, etc. This increase in HDD capacity, while reducing costs, can affect performance in some situations. For example, operations that require writing to large portions of the disk (such as a rebuild of a failed volume of a disk drive array) can take significant amounts of time given the increased capacity.

One way to address the need for greater HDD performance is to utilize multiple read/write heads in parallel. Such parallelism can increase the rate of input/output operations (IOPS) and thereby speed up certain operations. Use of simultaneously operating read/write heads can provide other options for a system designer instead of just increase in IOPS. For example, an HDD can be configured with zones having different levels of throughput and capacity, and multiple heads can be operated in different modes to improve throughput in some zones while improving capacity (or other performance parameter) in others.

In embodiments described below, a hard disk drive includes multiple heads driven by separate actuators that can read from or write to one or more disks simultaneously. Simultaneously active heads can be used to increase sequential data rate or for other purposes (e.g., to increase reliability, service different requests in parallel, etc.). The multiple heads can access the same disk or different disks, and may be moved across the disk surfaces in a number of different ways. In one configuration, a two (or more) part actuator may independently rotate two arms about a common axis. In other configurations, two or more actuators may be located at different locations around the disk, independently rotating about different axes.

Designs with multiple actuators simultaneously driving multiple heads can be flexibly configured, providing many options for optimizing different design parameters. In order to take advantage of this flexibility and still achieve high performance, the actuators may be controlled by separate controllers. Generally, these controllers may each include independent logical processing circuits such as central processing units (CPUs), microcontrollers, and/or systems-on-a-chip (SoC). In this way, the servo control systems that position each actuator can work independently without having to deal with contention for computing resources, e.g., instruction queues, memory, input-output (I/O) lines, etc.

Conventional hard disk drives, e.g., those with a single processor that drives a single actuator (which may include a dual-stage actuator) are configured such that a test fixture can control operations of the drive via a communications bus, e.g., serial I/O lines such as RS-232, RS-422, etc. Because these test fixtures represent significant capital expenses, they are generally expected to be used for current and future devices without requiring significant hardware changes. Therefore, a dual-controller drive as described herein has features that allow it to be used with existing test communications hardware that is designed for use with single controller drives.

While specific examples described below include dual-controllers that control independent read/write heads, these concepts can be extended to any data storage drive with a legacy (e.g., hard disk drive) interface. For example, a solid-state drive (SSD) may be configured to use an interface (e.g., SATA, SCIS, SaS) that is logically and electrically compatible with legacy hard drive protocols and interface hardware, even though the SSD uses solid-state memory (e.g., flash memory) instead of a magnetic disk to store data. An SSD may also make use of multiple controllers, e.g., to control independent storage sections, to facilitate parallel data streams, etc. As such, an SSD or other such data storage drive may use a similar scheme as described below to interface with legacy testing hardware.

Figure 1:
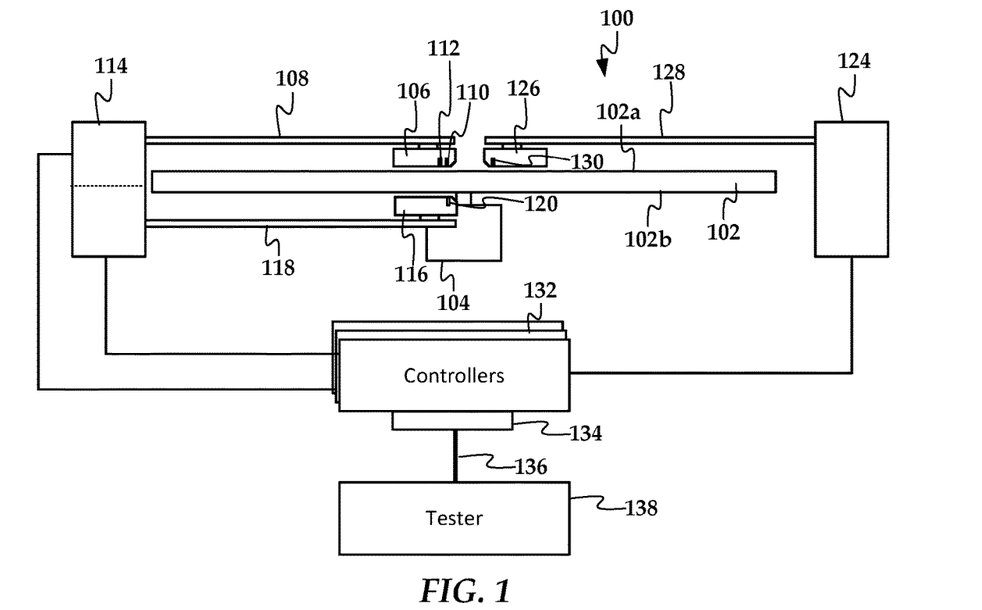
FIG. 1 is a diagram of an apparatus according to an example embodiment.

In FIG. 1, a diagram illustrates an apparatus 100 according to an example embodiment. An apparatus 100 includes at least one magnetic disk 102 driven by a spindle motor 104. A slider 106 (also referred to as a head, read/write head, read head, write head, recording head, etc.) is held over a first surface 102*a* of the disk 102 by an arm 108. An actuator 114 moves (e.g., rotates) the arm 108 to place the slider 106 over different tracks on the disk 102. In one embodiment, the slider includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102.

The apparatus 100 includes a second slider 116 supported by a second arm 118. The second slider 116 is held over a second surface 102*b* of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The slider 116 also includes read and/or write transducers 120. The transducers 120 are capable of reading from and/or writing to disk surface 102*b* simultaneously with one or both of read/write transducers 110, 112 that access disk surface 102*a*.

In another embodiment, the apparatus 100 includes a third slider 126 supported by a third arm 128. The third slider 126 (and its associated actuation hardware) may be included instead of or in addition to the second slider 116. The third slider 126 is held over the first surface 102*a* of the disk 102 as a second actuator 124 causes the third arm 118 to move to different tracks on the disk 102. The arm 128 and actuator 124 move independently of arm 108 and actuator 114. The slider 126 includes read and/or write transducers 130. The transducers 120 is capable of reading data from disk surface 102*a* simultaneously with one or both of read transducers 110, 112 of first slider 106. In this embodiment, the first slider 106 may include all or only one of the two or more read transducers 110, 112.

In the examples shown in FIG. 1, more than one disk 102 may be used, and the actuators 114, 124 may include heads that access some or all of the disk surfaces. Independently movable heads that utilize a split actuator 114 may generally access different surfaces, e.g., heads 106 and 116 access different surfaces 102*a*, 102*b* at the same time. Independently movable heads that utilize non-coaxial actuators 114, 124 may access the same surface at the same time, e.g., heads 106 and 126 may both access surface 102*a* at the same time.

Two or more controllers 132 are coupled to the respective actuators 114, 124 and control movement of the actuators 114, 124. The controllers 132 may take commands from a system controller, e.g., specifying a seek location, track following commands, dithering. The controllers 132 determine the signals needed to move the actuators 114 to the commanded location, and utilize position data as feedback. The position data is generally provided by servo marks on the disk 102 that are read via the heads 106, 116, 126.

In order to use a legacy hardware interface of a tester 138, the apparatus includes control circuitry 134 that switches lines of a serial input/output test channel 136 between the controllers 132. For purposes of this disclosure, an input/output channel (or I/O channel) is understood to refer to one or more data transmission lines that facilitate at least one of sending data to or receiving data from a device. Input/output channels may provide both send a receive functions, and may include other lines, e.g., protocol control lines. Generally, the tester 138 sends an indicator (e.g., a command to write to or otherwise change an I/O port) over a receive line of the channel 136. Whichever controller 132 is currently listening on that receive line will send a signal that causes the circuitry 134 to couple at least some lines of the serial input/output test channel 136 to another of the controllers 132. This is shown in more detail in the block diagram of FIG. 2, which shows a data storage drive 200 according to an example embodiment.

Figure 2:
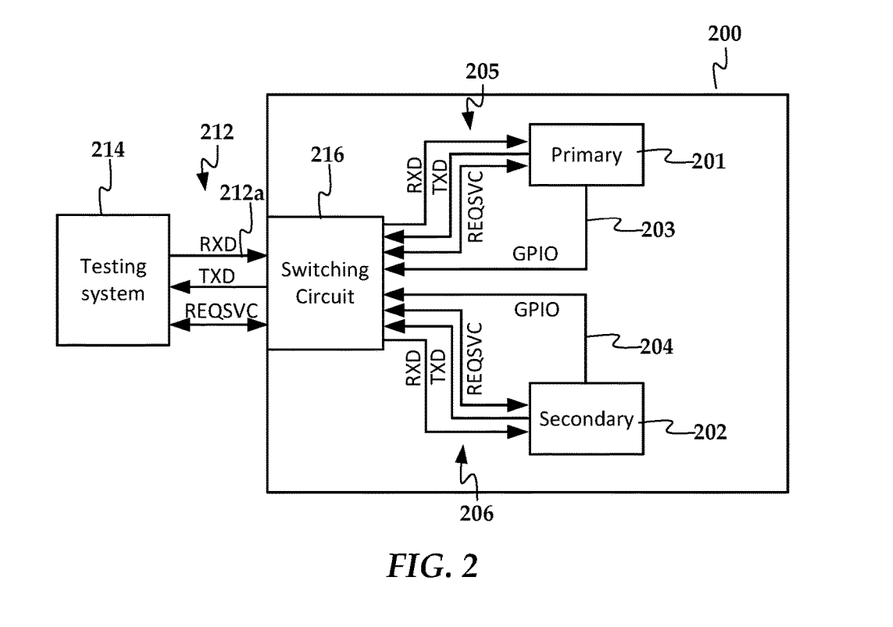
FIG. 2 is a block diagram of a multiple-controller data storage drive according to an example embodiment.

The drive 200 includes first and second controllers 201, 202 having respective first and second digital control outputs 203, 204 and respective first and second serial input/output channels 205, 206. The input/output channels 205, 206 in this example include data transmit (TXD) lines, data receive (RXD) lines, and service request lines (REQSVC). The controllers 201, 202 may be configured as servo controllers, I/O controllers, etc. The digital outputs 203, 204 may be any available logic outputs of the controllers, such as general-purpose I/O (GPIO) ports/lines.

The drive 200 is coupled to a serial input/output test channel 212 that is operable to communicate with a testing system 214. The controllers 201, 202 are configured to respond to commands sent via the RXD line 212*a* of the serial input/output test channel 212, the RXD line being coupled to corresponding RXD lines of one or both of the first and second serial communication input/output channels 205, 206. For example, upon initialization of the drive 200, the RXD lines of both channels 205, 206 may be coupled to the RXD line of the test channel 212. This allows the testing system 214 to broadcast commands to both the controllers 201, 202 upon initialization (e.g., after power on or reset). These initialization commands can cause the controllers 201, 202 to enter a particular mode and/or load a particular configuration when booting.

A switching circuit 216 is coupled to the first and second digital control outputs 203, 240, the first and second serial communication input/output channels 205, 206, and the serial input/output test channel 212. The switching circuit 216 is configured to, in response to respective combinations of binary values set via the first and second digital control outputs 203, 204, switch lines of the serial test channel 212 between the respective first and second serial channels 205, 206 of the first and second controllers 201, 202. The first and second controllers 201 are configured to select the combinations of binary values in response to commands received via the receive line 212*a* of the serial test channel 212.

Figure 3:
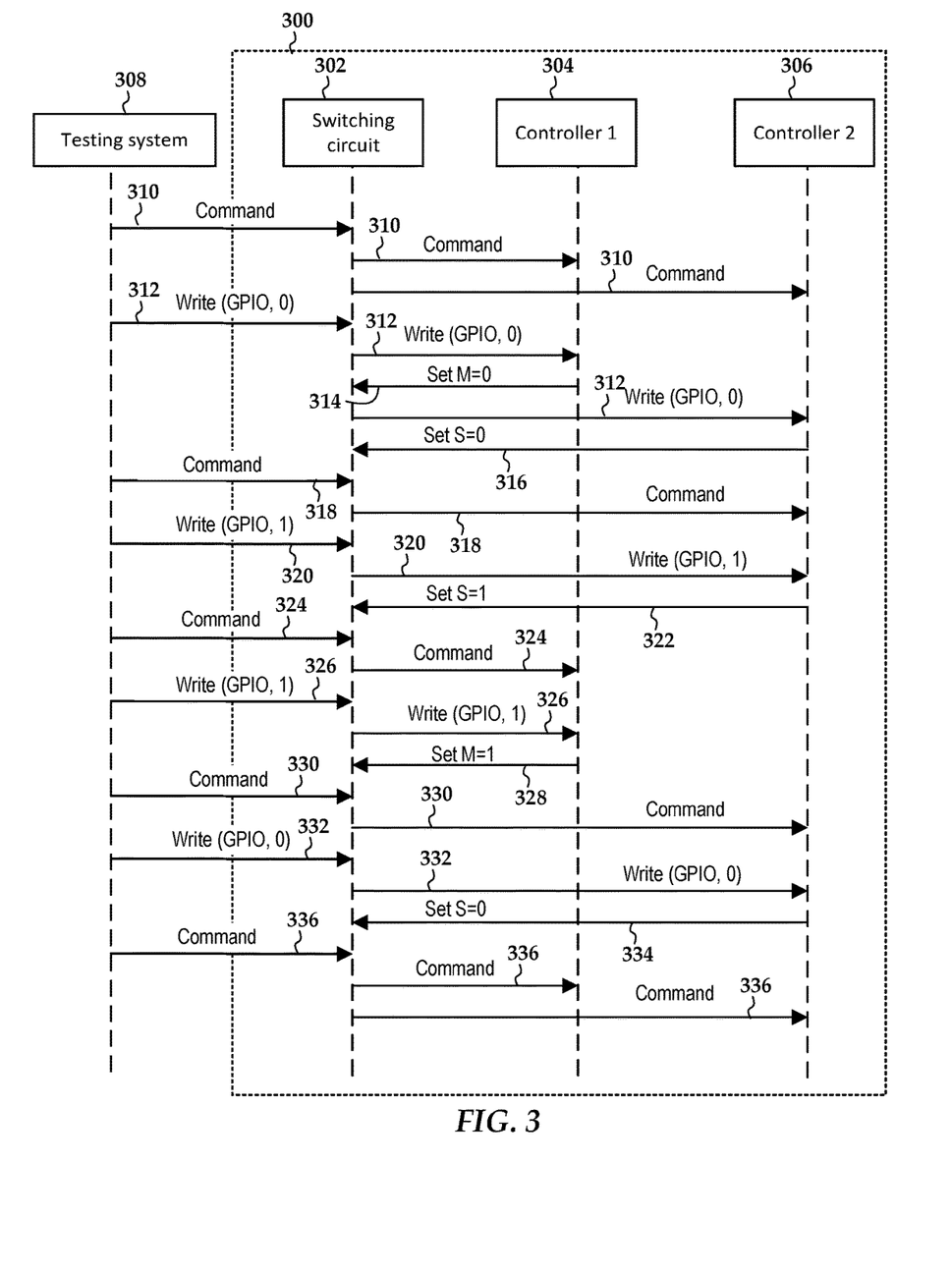
FIG. 3 is a sequence diagram showing communications between a testing system and data storage drive according to example embodiments.

In FIG. 3, a sequence diagram shows how a switching circuit 302 of a storage drive 300 operates with a testing system 308 according to an example embodiment. The switching circuit 302 is coupled to first and second controllers 304, 306 of the drive 300. The testing system 308 is coupled to the controllers 304, 306 via the switching circuit 302. In this example, only the switching of the RXD lines is shown, which transmit data communicated from the testing system 308 to the controllers 304, 306. For purposes of this example, the first controller 304 is a primary/master controller, and the second controller 306 is a secondary/slave controller. The master controller 304 has control of the spindle motor as well as one of the actuators, while the slave controller 306 controls just the other actuator. These roles can be determined at startup, e.g., by setting the state of a GPIO pin to low or high to indicated the role. It will be understood that this configuration is shown for purposes of example, and the switching circuit 302 does not rely on any primary/secondary or slave/master relationships to perform the indicated functionality.

At the beginning of the sequence shown in FIG. 3, the switching circuit 302 is in an initialized state, which is a default state entered into after power is applied. The switching circuit 302 has two digital input lines M and S that are coupled to the respective digital control outputs (GPIO) of the first and second (e.g., master and slave) controllers 304, 306 (see, e.g., GPIO 203, 204 of FIG. 2). Thus communications going from the controllers 304, 306 to the switching circuit 302 involve setting the GPIO lines to low or high voltage to assert a respective combination of zeroes and ones on the M and S input lines of the switching circuit 302.

In the initialization state, the binary combination (M, S) of the input lines is set to (1, 0), and the RXD line of the testing system 308 is coupled to RXD lines of both the first and second controllers 304, 306. As a result, a first command 310 sent by the testing system 308 is broadcast to both controllers 304, 306. The TXD and REQSVC lines of only one of the controllers 304, 306 will be coupled to the testing system 308, in this case that of the first/master controller 304. As a result, while both controllers 304, 306 may provide a response (not shown) to the command 310, only that response from the first controller 304 will be read by the testing system 308.

A second command 310 is sent to drive 300 from the testing system 308, and as before is sent to both controllers 304, 306 via the switching circuit 302. This command 310 may be, e.g., sent to operating systems of the controllers 304, 306, and generally causes the controllers to set their GPIO lines high or low depending of the second parameter of the command 310 being '1' or '0', respectively. As a result, the first controller 304 sets 314 the M line of the switching circuit 302 to '0', and the second controller 306 sets 316 the S line of the switching circuit 302 to '0'. Thereafter, the switching circuit 302 is in a (0, 0) state. In the (0, 0) state, subsequent commands are sent to just the second controller 306 its RXD line, as indicated by command 318. The TXD and REQSVC lines of the second controller 306 are also coupled to the testing circuit in this state, causing communications in the (0, 0) state to be exclusively between the testing system 308 and the second controller 306.

In order to advance to the next state of the switching circuit 302, the testing system 308 sends a command 320 to the second controller 306 that causes a '1' to be set 322 on the S input pin. This puts the switching circuit 302 is in a (0, 1) state, in which TXD, RXD, and REQSVC of the testing circuit 308 are all coupled to just the first controller 304, as indicated by subsequent command 324. To advance to the next state of the switching circuit 302, the testing system 308 sends a command 326 that causes a '1' to be set 328 on the M input pin via the first controller 304. This puts the switching circuit 302 is in a (1, 1) state, in which TXD, RXD, and REQSVC of the testing circuit 308 are all coupled to just the second controller 306, as indicated by subsequent command 324. Finally, by sending a command 332 that causes the S pin to be set 334 to '0' via the second controller 306, the switching circuit 302 is again in the (1, 0) state, and thus a command 336 is broadcast to both controllers 304, 306.

Figure 4:
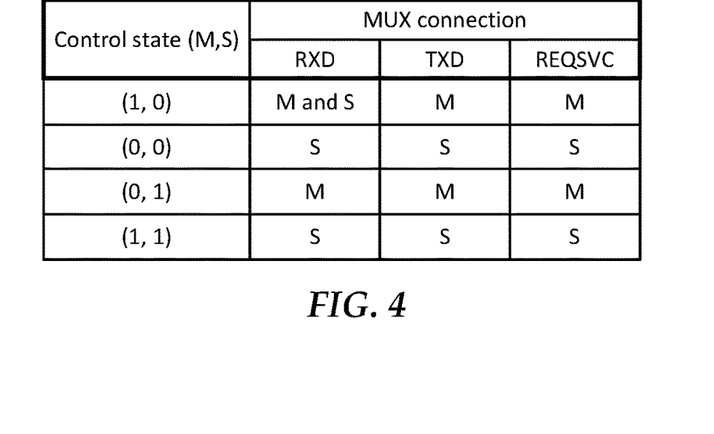
FIG. 4 is a truth table of a switching circuit according to an example embodiment.
Figure 5:
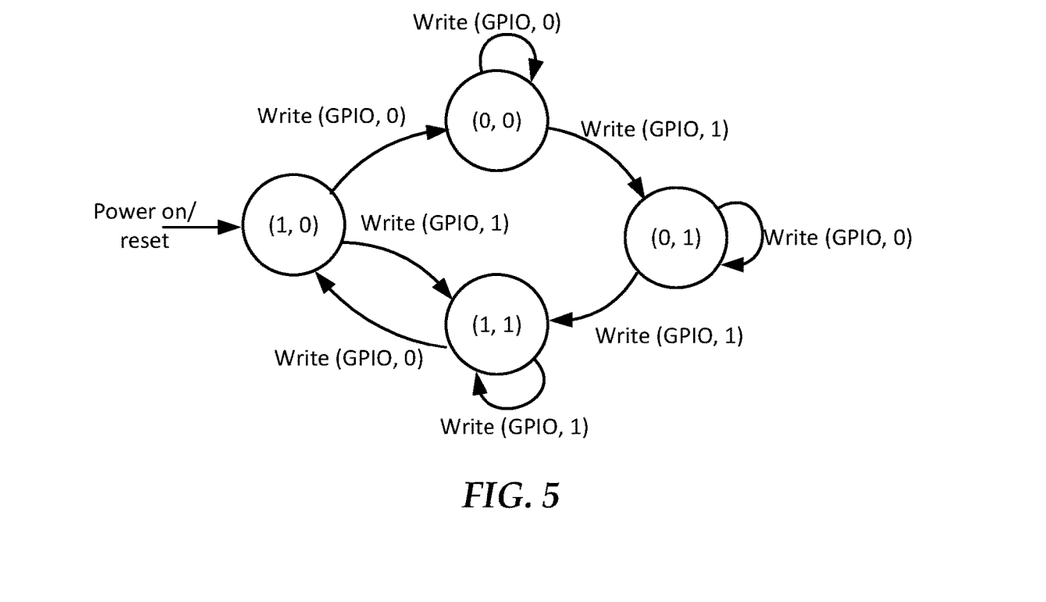
FIG. 5 is a state diagram of a switching circuit according to an example embodiment.

It will be understood that the commands 310, 318, 324, 330, 336 are optional, and are included to illustrate the current state of the RXD line of the switching circuit 302. For example, the testing circuit could issue successive Write(GPIO, x) commands in order to achieve a known state. In other cases, the testing system 308 may only receive data, e.g., monitor console messages, once a desired state has been set. In FIG. 4, a truth table shows the control states and associated multiplexing of the lines in each state. In FIG. 5, a state diagram shows the transitions between states using the Write commands as shown in the example of FIG. 3. As should be evident from the truth table and state diagram, even if the current state is unknown, writing a '1' two or more times will result in the switching circuit being in the (1, 1) state, after which any desired state can be navigated to as indicated by the state diagram.

Figure 6:
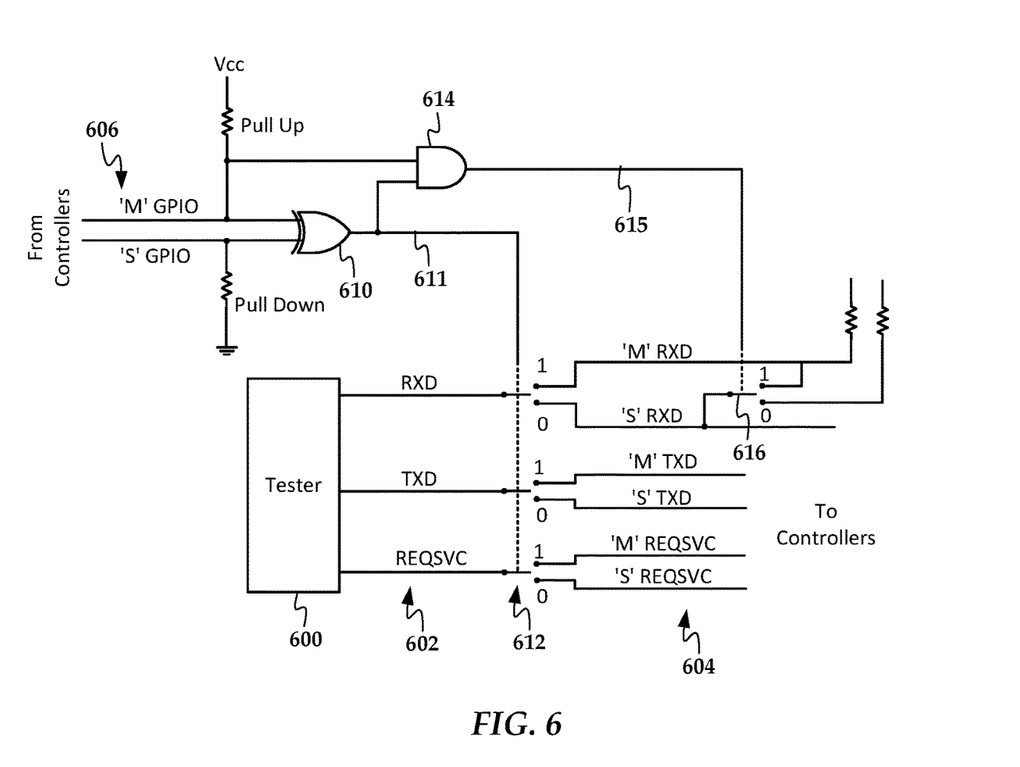
FIG. 6 is a schematic of a switching circuit according to an example embodiment.

In FIG. 6, an electrical schematic shows an implementation of a switching circuit according to an example embodiment. A tester 600 has a serial I/O channel 602 with three lines (RXD, TXD, REQSVC). Serial I/O channels 604 are coupled to separate controllers (not shown) as indicated by the labels. For example, 'M' TXD is the data transmit line of the primary/master controller and 'S' RXD is the data receive line of the secondary/slave controller. The controllers also provide respective digital control outputs 606 that form a pair of binary values that are input to an XOR gate 610.

The XOR gate 610 will output a '1' when the binary values are different, specifically (0, 1) and (1, 0). This causes switching elements 612 to move to the '1' position, thereby coupling the lines of the test channel 612 to that of the master controller. The XOR gate 610 will output a '0' when the binary values are the same, specifically (0, 0) and (1, 1). This causes switching elements 612 to move to the '0' position, thereby coupling the lines of the test channel 612 to the lines of the slave controller. While the switching elements 612 are illustrated as physical switches, they can generally be implemented using solid state electronics, e.g., transistors.

For the state (1, 0), the output 611 of the XOR gate is '1', and this output 611 is also coupled to the input of AND gate 614. The other input of the AND gate 614 is the 'M' GPIO line, which is also '1' in the (1, 0) state. Therefore, in the (1, 0) state the output 615 of the AND gate 614 is '1', and causes switching element 616 to couple the 'M' and 'R' RXD lines together with the RXD line of the tester 600. This enables the broadcasting of commands from the tester 600 to both controllers in the (1, 0) state.

The embodiments above show a dual-controller drive with a switching circuit that enables switching a test system channel between corresponding channels of the multiple controllers. Because the switching logic uses the controllers themselves to cause the switching, no additional lines are needed between the test system and the drive to switch between controllers. This enables backwards compatibility with testing systems configured for single-controller drives, as well as other components such as drive connectors.

The embodiments above can be expanded to more than two controllers. For example, additional digital control lines can be added such that the digital control outputs of the controllers can potentially define more than the indicated number of states and state transitions. Further, while the testing and controller channels have been illustrated as two-way serial I/O channels, a switching circuit as described above can be applied to any type of communications channels, such as parallel ports, Universal Serial Bus (USB), Ethernet, PCI, etc.

Figure 7:
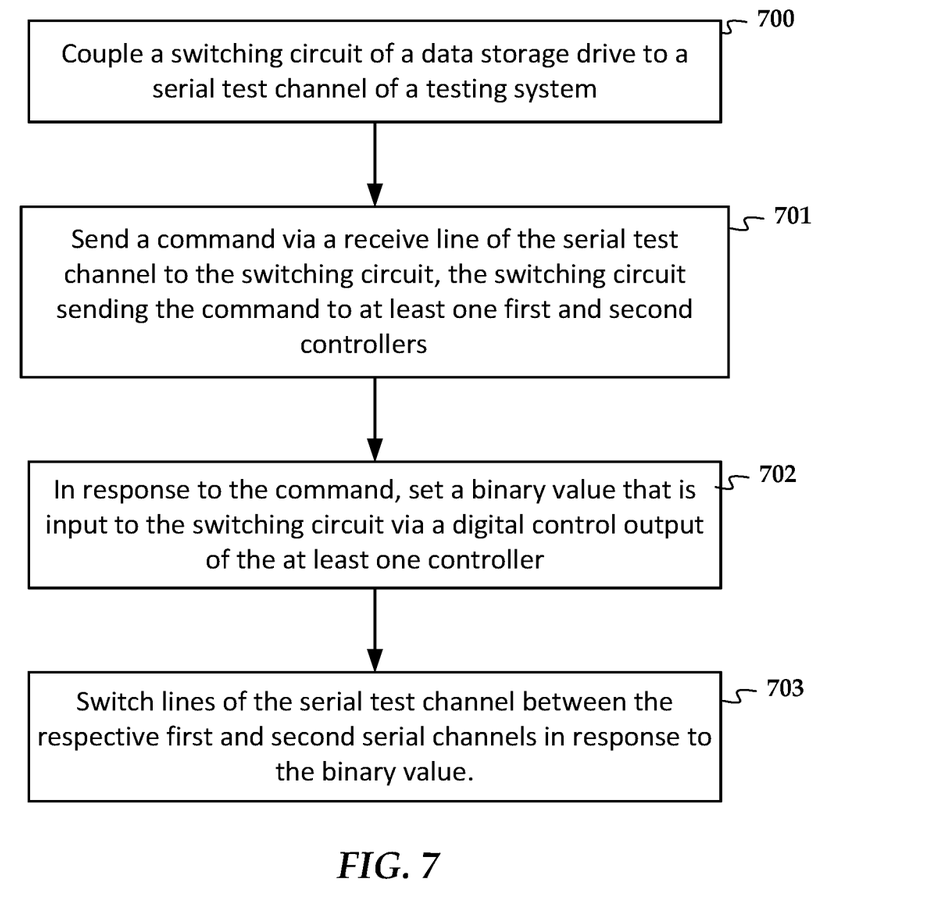
FIG. 7 is a flowchart of a method according to an example embodiment.

In FIG. 7, a flowchart shows a method according to an example embodiment. The method involves coupling 700 a switching circuit of a data storage drive to a serial test channel of a testing system. A command is sent 701 via a receive line of the serial test channel to the switching circuit. The switching circuit sends the command to at least one first and second controllers of the data storage drive via corresponding first and second serial channels. In response to the command, a binary value is set 702 that is input to the switching circuit via a digital control output of the at least one controller. Lines of the serial test channel are switched 703 between the respective first and second serial channels of the first and second controllers in response to the binary value.

Figure 8:
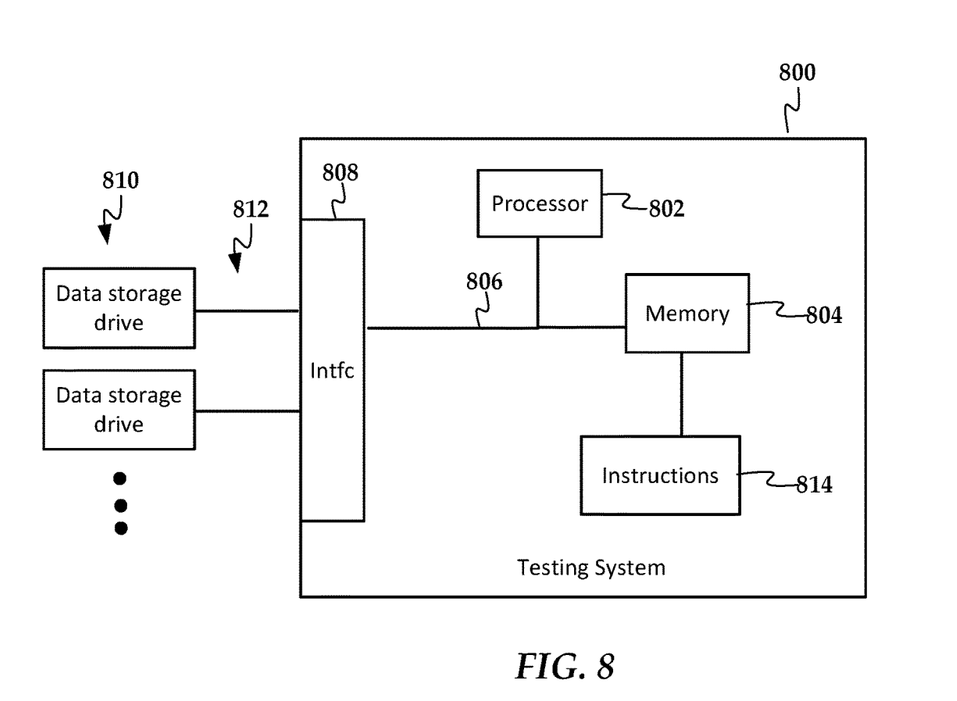
FIG. 8 is a block diagram of a testing system according to an example embodiment.

In FIG. 8, a block diagram illustrates a testing system 800 according to an example embodiment. The testing system 800 includes computing hardware such as a processor 802, memory 804, and I/O busses 806. An external interface 808 facilitates communications with one or more data storage drives 810 via one or more communications channels 812, e.g., serial I/O test channels. The processor 802 is operable via instructions 814 stored in the memory to initiate communications with the drives 810 as part of a factory procedure, e.g., test, initialization, etc. The instructions cause the processor 802 to sends one or more command via a receive line of the serial input/output test channels 812 to switching circuits of the data storage drives 810.

The switching circuit sends the one or more commands to at least one first and second controllers of the data storage drives 810 via corresponding first and second serial input/output channels. In response to the commands, the data storage drives set a binary value that is input to the switching circuit via a digital control output of the at least one controller. In response to the binary value, the switching circuit switches lines of the serial input/output test channel between the respective first and second serial input/output channels of data storage drives 810. The testing system 800 keeps track of states of the switching circuits and can selectively communicate with the individual controllers by sending a series of the one or more commands to each of the drives 210.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A data storage drive, comprising:
   first and second controllers having respective first and second digital control outputs and respective first and second serial channels;
   a serial test channel operable to communicate with a testing system; and
   a switching circuit coupled to the first and second digital control outputs, the first and second serial channels, and the serial test channel, the switching circuit configured to, in response to respective combinations of binary values set via the first and second digital control outputs, switch lines of the serial test channel between the respective first and second serial channels of the first and second controllers, the first and second controllers being configured to set the combinations of binary values in response to one or more command received via a receive line of the serial test channel.

2. The data storage drive of claim 1, wherein, upon initialization, the switching circuit enters an initialization state in which first and second receive lines of the first and second serial channels are both coupled to the receive line of the serial test channel such that initialization commands from the testing system are broadcast to both the first and second controllers.

3. The data storage drive of claim 2, wherein only a first transmit line of the first controller is coupled to a transmit line of the serial test channel in the initialization state.

4. The data storage drive of claim 1, wherein the combinations of binary values define a plurality of states of the switching circuit.

5. The data storage drive of claim 4, wherein a known state can be achieved by twice successively writing a '1' via the one or more commands.

6. The data storage drive of claim 1, wherein the first and second serial channels and the serial test channel each comprise a data receive line, a data transmit line, and a request service line.

7. The data storage drive of claim 1, wherein the first and second digital control outputs comprise general-purpose input-output lines.

8. The data storage drive of claim 1, wherein the first controller is configured as a primary controller and the second controller is configured as a secondary controller.

9. The data storage drive of claim 1, wherein the first and second controllers comprise separate systems-on-a-chip.

10. A method comprising:
    coupling a switching circuit of a data storage drive to a serial test channel of a testing system;
    send a command via a receive line of the serial test channel to the switching circuit, the switching circuit sending the command to at least one first and second controllers of the data storage drive via corresponding first and second serial channels;
    in response to the command, setting a binary value that is input to the switching circuit via a digital control output of the at least one controller; and
    switching lines of the serial test channel between the respective first and second serial channels of the first and second controllers in response to the binary value.

11. The method of claim 10, further comprising, upon initialization, causing the switching circuit to enter an initialization state in which first and second receive lines of the first and second serial channels are both coupled to the receive line of the serial test channel such that initialization commands from the testing system are broadcast to both the first and second controllers.

12. The method of claim 11, wherein only a first transmit line of the first controller is coupled to a transmit line of the serial test channel in the initialization state.

13. The method of claim 10, wherein the combinations of binary values define a plurality of states of the switching circuit.

14. The method of claim 13, wherein a known state can be achieved by t twice successively writing a '1' via the one or more commands.

15. The method of claim 10, wherein the first and second serial channels and the serial test channel each comprise a data receive line, a data transmit line, and a request service line.

16. The method of claim 10, wherein the first and second digital control outputs comprise general-purpose input-output lines.

17. A testing system comprising:
a processor;
a serial test channel coupled to the processor and operable to communicate via a switching circuit of a data storage drive that is coupled to the testing system via an external interface; and
memory coupled to the processor and storing instructions that cause the processor to perform:
   sending one or more commands to the data storage drive that causes a first digital control output of a first controller of the data storage drive to set a binary value that is input to the switching circuit, the one or more commands sent via a first channel of the first controller; and
   in response to the binary value causing the switching circuit to couple a second channel of the second controller of the data storage drive to the serial test channel, communicate with the second controller via the serial test channel.

18. The testing system of claim 17, wherein upon initialization of the data storage drive, the switching circuit enters an initialization state in which respective first and second receive lines of the first and second serial channels are both coupled to the receive line of the serial test channel, the testing system configured to broadcast initialization commands to the first and second controllers via the first and second receive lines.

19. The testing system of claim 17, wherein the binary value defines a plurality of states of the switching circuit.

20. The testing system of claim 19, wherein a known state can be achieved by twice successively writing a '1' via the one or more commands.

* * * * *